April 1, 1952 S. C. SLIFKIN ET AL 2,591,309
PHOTOGRAPHICALLY SENSITIVE DIAZOTYPE ELEMENT
Filed Nov. 10, 1945
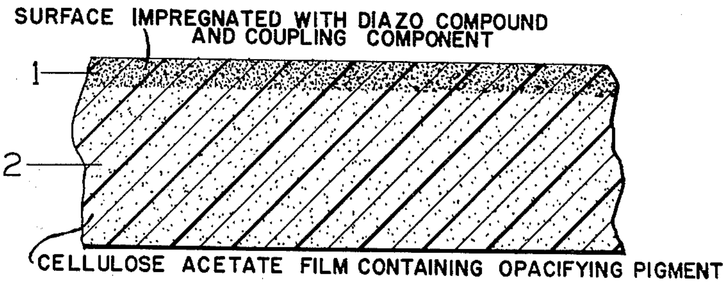
INVENTOR
SAM CHARLES SLIFKIN
WILLIAM BEESE
BY [signature]
[signature]
ATTORNEYS Patented Apr. 1, 1952

2,591,309

UNITED STATES PATENT OFFICE 2,591,309

PHOTOGRAPHICALLY SENSITIVE DIAZOTYPE ELEMENT

Sam Charles Slifkin and William Beese, Binghamton, N. Y., assignors to General Aniline & Film Corporation, New York, N. Y., a corporation of Delaware Application November 10, 1945, Serial No. 627,976

6 Claims. (Cl. 95—8)

This invention relates to light-sensitive reproduction media, particularly that type of reproduction media which reproduces positive copies from positive originals by developing the image in an azo dye color on an opaque or semi-opaque background.

Reproduction media of this kind, known as diazotype layers, are produced by treating the surface of a suitable base, generally paper, with a solution of the azo dye components in combination with each other, but in undeveloped state. Many combinations of diazo compounds and azo components which combine to form the azo dye image which are suitable for the production of such diazotype layers are known to the art. In order to reproduce the image as a positive, the diazo compound must be light-sensitive so that it will decompose to a compound no longer capable of forming an azo dye with an azo component in those areas which are exposed to light. It must also be capable of coupling under alkaline conditions generally by merely exposing the diazotype layer containing it to ammonia gas, but at the same time capable of existing in the diazotype layer in a dormant state so that it will not prematurely couple with the azo component. This property of the diazo compound which may be enhanced by the addition of stabilizing agents and small amounts of acids to the coating solution used in producing the diazotype layer endows the diazotype layer with "shelf life," thereby eliminating the necessity of preparing the copying material immediately before use.

The diazo component of such a light-sensitive material is most sensitive to light emission between the 3600 Å to 4200 Å line, which light emissions effectively decompose the diazo component so that it can no longer combine with the coupling compound to form a dye. Thus, when a diazotype layer is exposed under an original tracing, design, printed sheet or other original to be copied, to a source of light having the necessary emission characteristics, the diazo component in those areas which are not protected by the solid lines of the tracing or design is decomposed. Upon subsequent development a dye forms only in the areas which were protected from the light by the solid lines of the tracing or design. Those areas which were unprotected and hence exposed to light will be colorless and thus the design of the original will be reproduced in color on a colorless background. The development of the image is effected by contacting the exposed diazotype light-sensitive layer with a gaseous developing medium, such as ammonia gas, in a known manner.

Many types of carriers have been suggested for diazotype layers, the most common and commercially significant being paper and transparent carriers such as regenerated cellulose, cellulose esters and cellulose ethers and other types of commercial transparent film. For copy work, where it is desired to reproduce the image on an opaque background, the most extensively used medium for the carrier is paper. Although such a medium is admirably suited to the reproduction of tracings, drawings and designs, where the copy is for temporary use or is not to be subjected to extensive handling, it is not suitable for reproduction work where extensive handling is desired or where it may be necessary to clean or wash the copy during its continued use. Where a paper copy is made for such uses, it is necessary to protect it against soiling and destruction of the image by superimposing a transparent covering or coating over the image, which covering or coating can be washed without damage to the diazotype reproduction. Obviously, the paper base reproduction cannot itself be washed without impairment of the base material itself.

It is an object of this invention to provide a method of producing a light-sensitive diazotype layer on an opaque carrier which can be washed without impairment of the base material or the image and can, therefore, be put to such uses as demand excessive handling.

In the attainment of this object, it has been found that materials hitherto employed as carriers in the production of transparent diazotype media for the reproduction of the image on a transparent base can be employed for the reproduction of originals by the diazotype process when rendered opaque by the introduction of opacifying pigments. Such materials are cellulose esters and ethers, such as cellulose acetate. The carrier material for this process is prepared by mixing the cellulose ester or ether with plasticizers in suitable solvents in accordance with known methods for the solution of cellulose esters and ethers until a smooth, homogeneous solution has been obtained. During the course of the preparation of this solution or dope, the opacifying pigment which is one of the common inorganic types, which has been made extremely fine by careful grinding, is dispersed uniformly in the dope. The particular pigment employed in this step will depend upon the color desired in the opaque background of the diazotype copy. The most common are white pigments, such as titanium oxide, titanium white, barium sulfate, talcum powder and lithopone, although any pigment which is inert to the materials used in the light-sensitive coating may be employed. For producing colored effects, pigments such as iron oxide pigments may be employed.

After mixing the desired pigment into the cellulose ester dope, the latter is maintained at a viscosity adapted for film casting. Thorough filtration is necessary in order to produce a sufficiently smooth mixture for the casting process. In the casting process, the thus prepared dope is spread over a glass-like smooth surface by means of a hopper, care being taken to regulate the thickness of the layer so that the resulting base or carrier will be of uniform thickness. This casting operation is conducted in a closed machine where most of the solvents are evaporated off and the semi-dry sheeting is then removed from the casting surface by a continuous method. The sheeting is then passed over rollers and through a drying chamber in which the residual solvents are reduced to about 2%. In this condition, the sheet of opacified cellulose ester is trimmed to the desired width and wound on mandrels in the length desired for the light-sensitive coating operation.

The light-sensitive coating is applied to the opacified cellulose ester sheet by either the dip coating or bead dip method or by applying an excess of coating solution and doctoring off the excess, depending upon whether it is desired to coat both or only one side of the cellulose ester sheet. In the dip coating method, the cellulose ester sheet is drawn through a diazo light-sensitizing solution containing a solvent or plasticizer for the cellulose ester material and the excess coating solution is allowed to drip from the cellulose ester sheet as it is drawn out of the coating solution. In this way, impregnation of the two surfaces of the opaque cellulose ester sheet by the components of the diazo light-sensitizing solution is attained due to the swelling action of the cellulose ester solvent or plasticizer in the coating solution. In other words, the cellulose ester, which may be cellulose acetate, is treated to render it susceptible to penetration and impregnation with a light-sensitive diazo compound and azo component and is simultaneously impregnated with such components. More particularly, the cellulose acetate film is treated with a composition containing the light-sensitive components, whereby the film without any chemical change therein is, in a relatively short period of time, made susceptible to penetration by and impregnation with the light-sensitive components and simultaneously impregnated with such components. The liquid medium for the coating solution may be either aqueous or non-aqueous. The swelling agent may be an organic liquid substance which is a swelling agent for cellulose acetate or other cellulose ester or ether, and it may be used alone or in conjunction with a diluent such as water or a non-aqueous, non-solvent for cellulose acetate, as desired.

The swelling agent when applied to the cellulose acetate film rapidly swells said film without dissolving it and does not cause a change of shape of the film when the latter is dried after treatment. The organic solvents and organic liquids which are swelling agents should be volatile in order to perform this function. As examples of volatile organic substances which function as swelling agents, there may be mentioned: ethyl alcohol, methyl alcohol, butanol, ethyl lactate, formic and acetic acids, acetone, diacetone alcohol, ethyl-methyl ketone and methyl glycol. As examples of softeners or plasticizers, there may be mentioned: tricresyl phosphate, triphenyl phosphate, triacetin and dichlorhydrin.

The swelling medium or solvent for the cellulose ester may be employed singly, in combination with a non-solvent, such as water, benzene or toluene, or may be formed from a plurality of the swelling agents or solvents depending upon the nature of the plasticizer and the composition of the cellulose acetate film. Manifestly, there is no rule for determining the proportions of the respective ingredients of a swelling medium. However, we would prefer to use a mixture of water and alcohol for this purpose in a proportion of approximately two to one by volume.

When it is desired to coat or impregnate only one surface of the cellulose ester opaque film by the bead dip coating method, the opacified cellulose ester film is drawn across the coating solution with one side of the film in continuous contact with the meniscus of the coating solution. The side of the film which is thus in contact with the coating solution is rendered capable of penetration by and is simultaneously impregnated with the ingredients of the coating solution in the same manner as in the case of the through or dip coating method described above for impregnation of both sides of the film and the same type of coating solutions are employed. By the same principle of penetration or impregnation, a single side of the film may be coated by applying an excess of the coating solution to one side of the film and doctoring off the excess of coating solution by known methods.

Any combination of diazo and azo components which is suitable for the preparation of two-component diazotype layers and which will produce the desired shade for the final image may be employed in the light-sensitizing solution. Diazo compounds which are suitable for such two-component diazotype layers are known to be those which are derived from 1,2 and 2,1-aminonaphthols, 1,4-aminonaphthols and aromatic p-diamines of the benzene series, particularly those which are N-mono- or di-substituted on the undiazotized amino groups. Examples of such diazo compounds which are commonly used in the production of diazotype images of high contrast are p-amino-N-methyl aniline, p-amino-N-dimethyl aniline, p-amino-N-ethyl aniline, p-amino-N-diethyl aniline, p-amino-N-ethoxy aniline, p-amino-N-ethyl-N-ethoxy aniline, 4-amino-2-methoxy-1-cyclohexyl aniline, 1-amino-4-(dibrom-2′,6′-benzyl) aminobenzene, p-amino-N-diethyl-m-toluidine, 1-amino-3-methyl-4-ethylaminobenzene, 3-aminocarbazole, 1-amino-2-naphthol-4-sulfonic acid, and 2-amino-1-hydroxy-3,6-naphthalene disulfonic acid diazos.

As examples of suitable azo coupling components, there may be mentioned the sodium salt of 2-amino-8-naphthol-3,6-disulfonic acid (2R salt), 2,3-dihydroxy naphthalene or its 6-sulfonic acid derivative, $\beta$-naphthol-3,6-disulfonic acid, 2,7-dihydroxy naphthalene, 1,7-aminonaphthol, 2-hydroxy naphthalene-8-biguanide, 1-amino-8-naphthol-3,6-disulfonic acid, 1-naphthol-4-sulfonic acid, 1-naphthol-3,8-disulfonic acid, phloroglucinol, m-hydroxyphenylurea, acetoacetanilide, 7-hydroxy-1,2-naphthimidazole, 7-hydroxy naphthalene-1-biguanide and cyclohexyl acetoacet acid amide.

The accompanying drawing is a cross-section in part of a preferred embodiment of the present invention. In said drawing numeral 2 represents a water-impermeable, highly reflective cellulose acetate base of uniform composition throughout its cross-section and having uniformly dispersed therein a finely-ground opacifying pigment such as titanium dioxide, barium sulfate, and the like. Numeral 1 represents a surface impregnation in said base of a light-sensitive diazo compound derived from a p-diamine of the benzene series and an azo coupling component.

The following examples are given as illustrative of typical coating solutions which may be employed for impregnating the opacified cellulose ester carrier with a diazotype light-sensitive layer. It is understood that the invention is not in any way limited to the materials or proportions given in these examples and the proportions are by weight unless otherwise specified.

*Example 1*

| | | |
|---|---|---|
| Water | cc | 100 |
| Ethyl alcohol | cc | 50 |
| Citric acid | grams | 10 |
| Thiourea | do | 4 |
| Formic acid | cc | 10 |
| Zinc chloride | grams | 3 |
| 2,3-dihydroxynaphthalene | do | 0.5 |
| $ZnCl_2$ salt of 1-diazo-3-methyl-4-diethylamino benzene | grams | 7 |

A cellulose acetate sheet which has been rendered white opaque by dispersion therein of titanium dioxide is coated by one of the coating methods described above. It is then dried and exposed to light having the proper characteristics for decomposition of a light-sensitive diazo compound under a diapositive. The image is then developed on the sensitized white opaque cellulose acetate film by contacting the exposed side of the film to ammonia fumes under the usual conditions necessary for alkaline development of an azo dye image. The image will be developed in a deep blue on a white opaque background. The image is very brilliant because of the high reflectivity of the base material. It does not need to be protected from handling and can be used for operation charts, salesmen's data books, dials and panel markers, graph-coordinates and washable photographs. Changes can be made on such an image by the use of a wax pencil. Such washing as may be necessary after continued use of any such images can be practiced without impairment of the image or the dimensions of the carrier.

*Example 2*

| | | |
|---|---|---|
| Water | cc | 100 |
| Ethyl alcohol | cc | 50 |
| Citric acid | grams | 10 |
| Thiourea | do | 4 |
| Formic acid | cc | 10 |
| Zinc chloride | grams | 3 |
| Phenyl methyl pyrazolone | do | 0.5 |
| $ZnCl_2$ salt of p-diazo-diethyl aniline | do | 8 |

A cellulose acetate film rendered white opaque by dispersion therein of barium sulfate pigment is coated with the above coating solution, dried exposed and developed in the same manner as outlined in Example 1. The developed image will be red on the white background of the carrier. The image is very brilliant because of the high reflectivity of the base and the reproduced copy can be used for any of the uses outlined in Example 1 without the necessity of protecting it from handling or other soiling operations. It can also be submitted to such washing as may be necessary to preserve the brilliancy of the image without danger of impairing either the image or the carrier in any way.

It is understood that any of the diazo compounds or azo components listed above may be substituted for the like components employed in these examples and that other stabilizing and such materials as may be necessary for the proper production of a stable diazotype layer may be substituted for those specifically mentioned in the examples. Furthermore, any of the swelling agents, such as plasticizers and solvents of cellulose esters and ethers commonly used for that purpose, may be used in place of the ethyl alcohol of these examples to the extent that they are compatible in the light-sensitizing solution and do not create interfering side reactions.

Since it is obvious that various changes may be made by one skilled in the art in the coating solution, method of applying the coating solution to the carrier, and in the production of the pigmented opaque cellulose ester or ether carrier itself without departing from the nature or spirit of the invention, the invention is not limited to the specific details described except as defined in the appended claims.

We claim:

1. A white opaque light-sensitive diazotype reproduction medium consisting of a water-impermeable, highly reflective cellulose acetate base of uniform composition throughout its cross-section, and having uniformly dispersed therein a finely ground opacifying pigment selected from the group consisting of titanium dioxide and barium sulfate, which base is impregnated in its surface portions only with a light-sensitive diazo compound derived from a p-diamine of the benzene series and an azo coupling component.

2. The structure of claim 1 in which both surfaces of the base are impregnated with the light-sensitive diazo compound and the coupling component.

3. A white opaque light-sensitive diazotype reproduction medium consisting of a water-impermeable, highly reflective cellulose acetate base of uniform composition throughout its cross-section, and having uniformly dispersed therein a finely ground opacifying titanium dioxide pigment, which base is impregnated in its surface portions only with a light-sensitive diazo compound derived from a p-diamine of the benzene series and an azo coupling component.

4. The structure of claim 3 in which the light-sensitive compound is p-diazo diethyl aniline and the coupling component is 2,3-dihydroxynaphthalene.

5. A white opaque light-sensitive diazotype reproduction medium consisting of a water-impermeable, highly reflective cellulose acetate base of uniform composition throughout its cross-section, and having uniformly dispersed therein a finely ground opacifying barium sulfate pigment, which base is impregnated in its surface portions only with a light-sensitive diazo compound derived from a p-diamine of the benzene series and an azo coupling component.

6. The structure of claim 5 in which the light-sensitive compound is 1-diazo-3-methyl-4-diethyl aniline and the coupling component is phenyl methyl pyrazolone.

SAM CHARLES SLIFKIN.
WILLIAM BEESE.

(References on following page)

REFERENCES CITED

The following references are of record in the file of this patent:

UNITED STATES PATENTS

| Number | Name | Date |
|---|---|---|
| 1,570,076 | Pitman | Jan. 19, 1926 |
| 1,756,400 | Schmidt et al. | Apr. 29, 1930 |
| 1,758,676 | Schmidt et al. | May 13, 1930 |
| 1,966,412 | Krieger | July 10, 1934 |

FOREIGN PATENTS

| Number | Country | Date |
|---|---|---|
| 318,511 | Great Britain | Aug. 7, 1930 |
| 337,868 | Great Britain | Nov. 13, 1930 |
| 833,508 | France | July 18, 1938 |
| 509,316 | Great Britain | July 13, 1939 |
| 536,714 | Great Britain | May 23, 1941 |